UNITED STATES PATENT OFFICE.

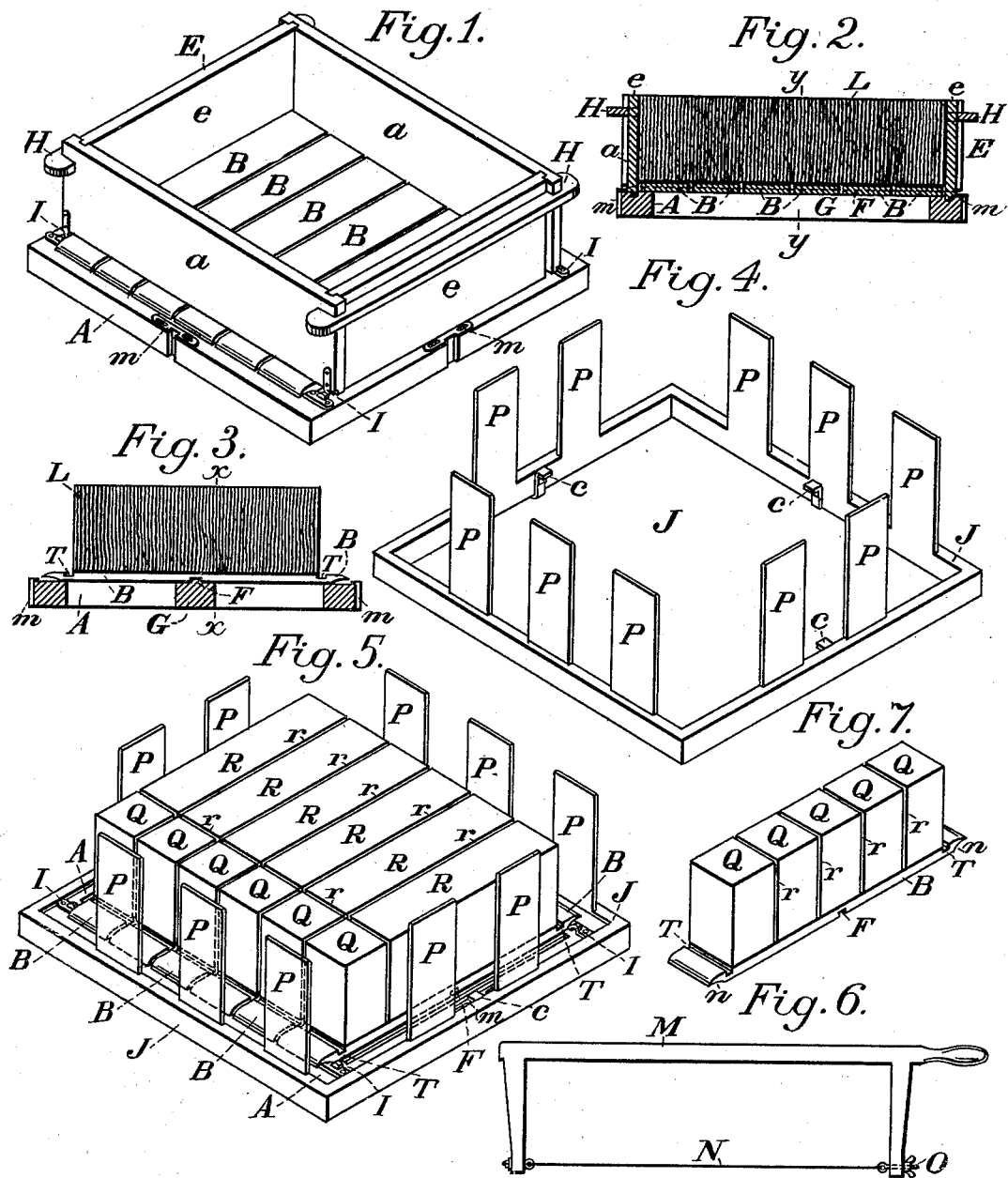

PETER OLUF ANDREASEN, OF FERNDALE, CALIFORNIA.

BUTTER-MOLDING APPARATUS.

SPECIFICATION forming part of Letters Patent No. 509,714, dated November 28, 1893.

Application filed August 22, 1893. Serial No. 483,762. (No model.)

*To all whom it may concern:*

Be it known that I, PETER OLUF ANDREASEN, a citizen of the United States, residing at Ferndale, in the county of Humboldt, State of California, have invented certain new and useful Improvements in Butter-Molding Apparatus; and I hereby declare the following specification and drawings therewith to be a full, clear, and exact description of my improvements.

My invention relates to apparatus for molding and cutting butter into cubes or rolls of uniform size or weight, and is an improvement or simplification of apparatus for a similar purpose, set forth and described in Letters Patent of the United States No. 491,792, granted to me on the 14th of February, 1893, for an improved butter-molding and cutting machine.

My present invention consists of a separable inclosing frame or mold, mounted on a base by means of registering devices to secure an exact position of the frame; a sectional bottom composed of separable bars resting upon the base or main frame, notched or grooved at their ends to receive the sides or ends of the inclosing frame, also registered and guided by other suitable devices, and a detachable templet or guiding frame by means of which the butter is severed into cubes or rolls of uniform size and weight.

The object of my invention is to attain by simple means a rapid and accurate division of butter into cubes or rolls of uniform size, and to provide facilities for removing and handling such rolls when completed, as will be more fully pointed out in the drawings herewith, and set forth in the claims at the end of this specification.

Referring to the drawings: Figure 1 is a perspective elevation of my improved butter-molding apparatus with the templet or cutting frame removed. Fig. 2 is a transverse section through Fig. 1, and on the line x—x of Fig. 3, showing the mold filled with butter before it is severed into cubes or rolls. Fig. 3 is another section, on the line y—y of Fig. 2, showing the apparatus with the sides removed and ready to receive the templet or cutting frame for severing the butter into cubes or rolls. Fig. 4 is a guiding or templet frame, by means of which, with a suitable cutting implement, the butter is severed into cubes or rolls. Fig. 5 shows the main frame of the apparatus with the templet or guiding frame applied thereto, and the butter partially severed into cubes or rolls. Fig. 6 shows a cutting implement such as is employed in severing the butter into cubes. Fig. 7 shows one of the bottom bars removed from the main frame with cubes or rolls of butter thereon.

Similar letters of reference are employed to indicate corresponding parts in the different figures of the drawings.

The main member or base frame A of my improved butter-molding and cutting apparatus is made rectangular in form with dimensions to suit for a predetermined number of cubes or rolls of butter, in this case thirty, but the number may be more or less as the convenience or requirements of use may demand. On the top of this main frame A are placed a number of detachable or removable bars B, the width of which corresponds to that of the sides of the cubes of butter Q. These bars B have cross grooves T at the ends to receive the bottom edges of the sides a of the inclosing frame E, also have across their width on the bottom side grooves or channels F, fitting over a suitable ledge on the bar G of the bottom frame A, so as to hold them in a proper position when they are laid on and before the inclosing frame E is applied. The lateral inclosing frame E is composed of sides a and e, the corners being joined by a ledge and groove, as shown in Fig. 1, and is held when in place by the clamps H, which are pressed on after the sides a and e are in position. The sides a of the inclosing frame E are held at the bottom by metallic clamps I, which, beside registering or adjusting the frame E in its proper position on the main member A, also prevent these sides from rising until laid down flat, or set at an angle so the clamps I will be released.

Describing now the operation of my improved apparatus, the bottom or main frame A and the inclosing frame E are arranged as shown in Fig. 1, with the bars B in place and packed full of butter, as shown in Fig. 2, the top being stroked off level with the sides. The inclosing frame E is then removed, and the gaging or templet frame J is applied, fitting down over the main frame A as shown in Fig. 5. This frame J is provided with vertical bars or templets P, the sides of which correspond to the dividing lines r, cut through the mass of butter, and act as gages or guides for the cutting implement shown in Fig. 6, thus producing with accuracy the cubes or rolls Q. This templet frame J is provided with registering lugs c that fit into corresponding metal guides m on the main frame A. So the templet frame is held with accuracy in the proper position with respect to the inclosing frame E and the bottom bars B. The guides m are held by screws inserted in slots, so as to permit lateral movement, and enable the templet frame J to be adjusted concentric with the mass of butter L, and so the cubes or rolls when cut will be of the same dimensions and uniform in weight. When the apparatus is in the position thus explained, the mass of butter L is severed by an implement such as is shown in Fig. 6, consisting of a stock of wood or metal M, and a cutting wire N held in tension by a thumbscrew O as shown.

In using this implement the wire N is placed against the sides of the bars or templets P attached to the frame J, and is pressed down through the butter L both ways, severing the mass into cubes or rolls Q, as shown in Fig. 5, where the cutting is completed in one direction and one cut made in the other direction, completing six cubes Q, as shown after which the remaining sections R are severed in the same manner, and each one of the bottom bars B will contain five cubes, as shown in Fig. 7. These bars B are formed at the ends as shown at n n, Fig. 7, so as to be conveniently handled and removed from the apparatus with the cubes or rolls of butter thereon, to some place for permanent packing and shipment. It will thus be seen that the various operations required for molding and severing the butter into cubes or rolls are performed with simple apparatus not liable to derangement, and not requiring special skill.

Having thus explained the nature and objects of my invention, what I claim as new, and desire to secure by Letters Patent, is—

1. In a butter molding apparatus, the combination of a main bottom or supporting frame, a series of removable bars placed thereon, said bars having cross grooves on their upper sides at the ends and also having transverse grooves on the under side which fit over a ledge on the bottom frame and said bars corresponding in width to that of the cubes or rolls of butter to be formed, a separable inclosing frame or mold resting upon the bars and the clamps I for keeping these several parts in the proper position, substantially as described.

2. In a butter molding apparatus, the combination of the main bottom frame of rectangular form, a series of detachable bars placed thereon having cross grooves on their upper sides at the ends and also having transverse grooves on the under side which fit over a ledge on the bottom frame, the separable inclosing frame or mold which rests upon the detachable bars and has its edges entering the grooves in said bars and clamps at the corners of the main frame for holding the inclosing frame in a firm position, all the parts being combined and arranged so that the mold can be readily removed when desired, substantially as specified.

3. In butter-molding apparatus, as herein described, a rectangular base frame, removable bars on the top thereof; a superimposed detachable inclosing frame or mold having ledges at the bottom fitting into corresponding cross grooves in the ends of the removable bars; fastening devices to connect the inclosing frame to the bottom, or main one in the manner described; and removable clamps spanning two sides thereof, so the whole can be readily separated when the mold is filled with butter or for other purposes and an adjustable and removable templet frame, substantially as described and shown.

4. In butter-molding apparatus, as herein described, a main base frame having fitted thereon removable bars, the width of which will correspond to the size of the cubes or rolls of butter to be prepared; a templet or gaging frame fitting over the main or base frame, provided with vertical bars or templets as shown, the sides of the latter corresponding to the lines to be cut through the butter, so as to produce cubes or rolls of uniform size and weight, in the manner substantially as described.

5. In butter-molding apparatus, as herein described, a rectangular base or main frame in combination with a series of removable bars; a separable inclosing mold or frame; an adjustable and removable templet frame, and a cutting implement to sever the butter, the whole operating together, in the manner substantially as and for the purposes set forth.

6. In a butter molding apparatus, a templet or gaging frame fitting over the main base and provided with the vertical bars or templets substantially as shown, the sides of which correspond to the lines to be cut through the butter so as to produce cubes or rolls of uniform size and weight, substantially as described.

In testimony whereof I have hereunto affixed my signature in the presence of two witnesses.

PETER OLUF ANDREASEN.

Witnesses:
J. A. SHAW,
H. B. CHRISTIANSEN.